SERIAL DELAY LINE BUFFER-TRANSLATOR

Filed March 2, 1965 9 Sheets-Sheet 1

INVENTORS
LESTER R. ADAMS
PHILIP A. LORD

BY Donald L. Campbell
ATTORNEY

Sept. 9, 1969 L. R. ADAMS ET AL 3,466,432

SERIAL DELAY LINE BUFFER-TRANSLATOR

Filed March 2, 1965 9 Sheets-Sheet 4

United States Patent Office 3,466,432
Patented Sept. 9, 1969

3,466,432

SERIAL DELAY LINE BUFFER-TRANSLATOR

Lester R. Adams, Saratoga, Calif., and Philip A. Lord, Vestal, N.Y., assignors to International Business Machines Corporation, Armonk, N.Y., a corporation of New York Filed Mar. 2, 1965, Ser. No. 436,520
Int. Cl. G06f *5/00*
U.S. Cl. 235—154 8 Claims This invention relates to code translators or converters, and more particularly to a serial delay line buffer-translator for converting a plurality of different codes to a single machine language code.

An object of the invention is to provide a new and improved translator for converting several codes on different transmission lines from several types of data processing equipment into a single machine language code for feeding into the central processing unit of a multiplexing computer.

Another object is the provision of a new and improved buffer-translator for connection to a plurality of transmission lines operating with different codes and bit rates and working at times asynchronously with respect to one another, to buffer the various coded characters and convert them to a single machine code.

Yet another object of the invention is to utilize a serial memory device such as a delay line as a combination buffer and code translator where there may be a number of codes.

The foregoing and other objects, features, and advantages of the invention will be apparent from the following more particular description of preferred embodiments of the invention, as illustrated in the accompanying drawings wherein.

Figure 3A:
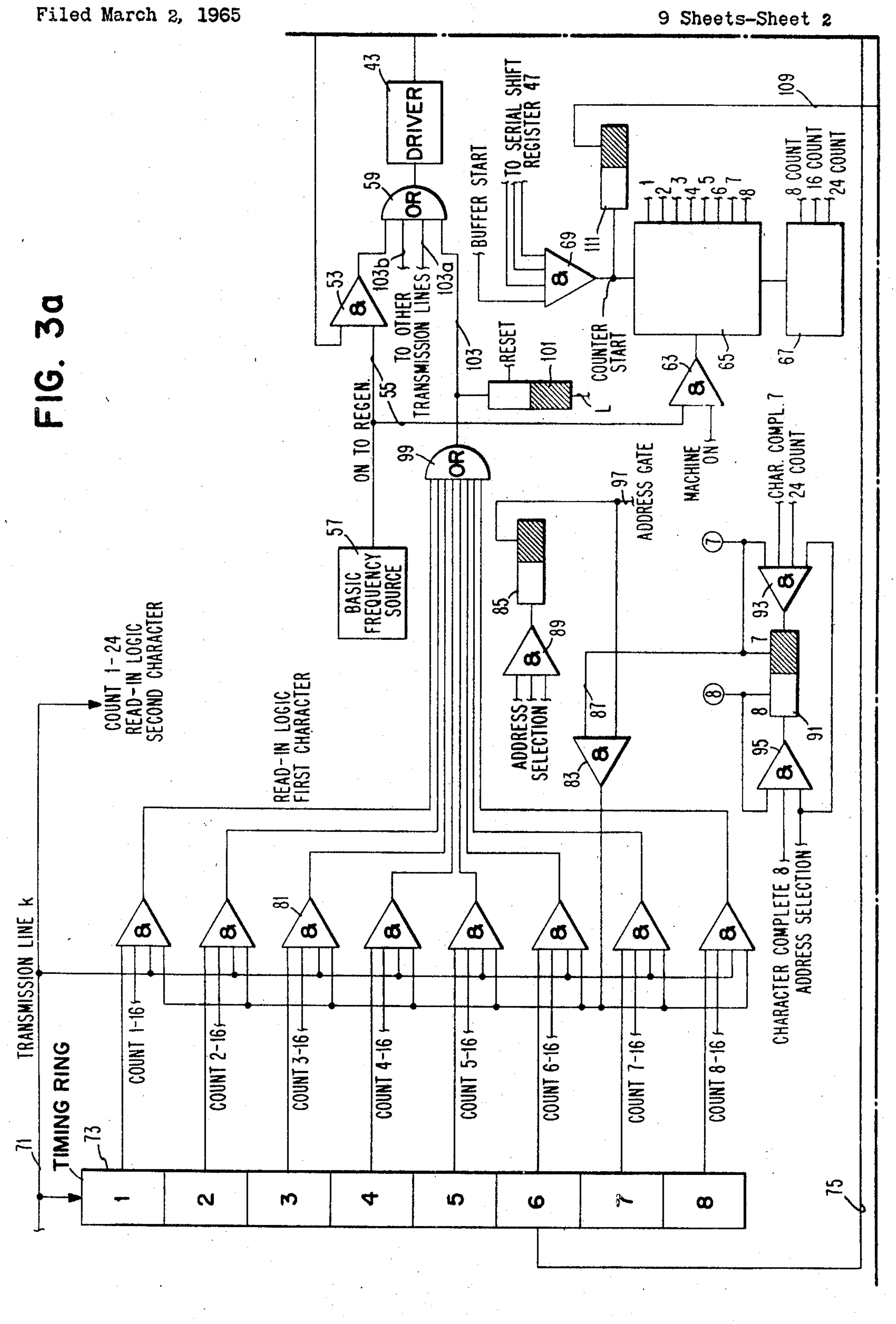
Figure 3B:
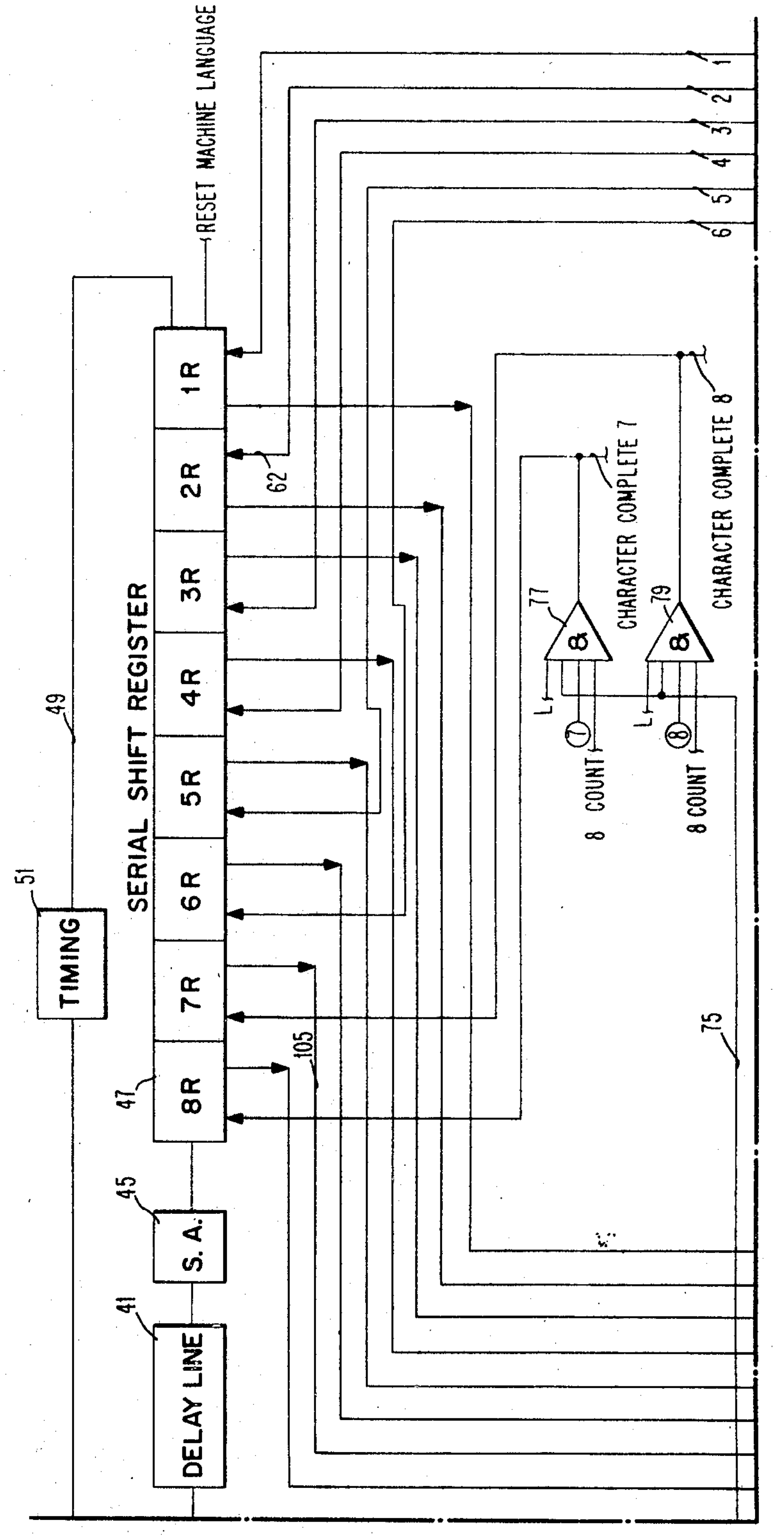
Figure 3C:
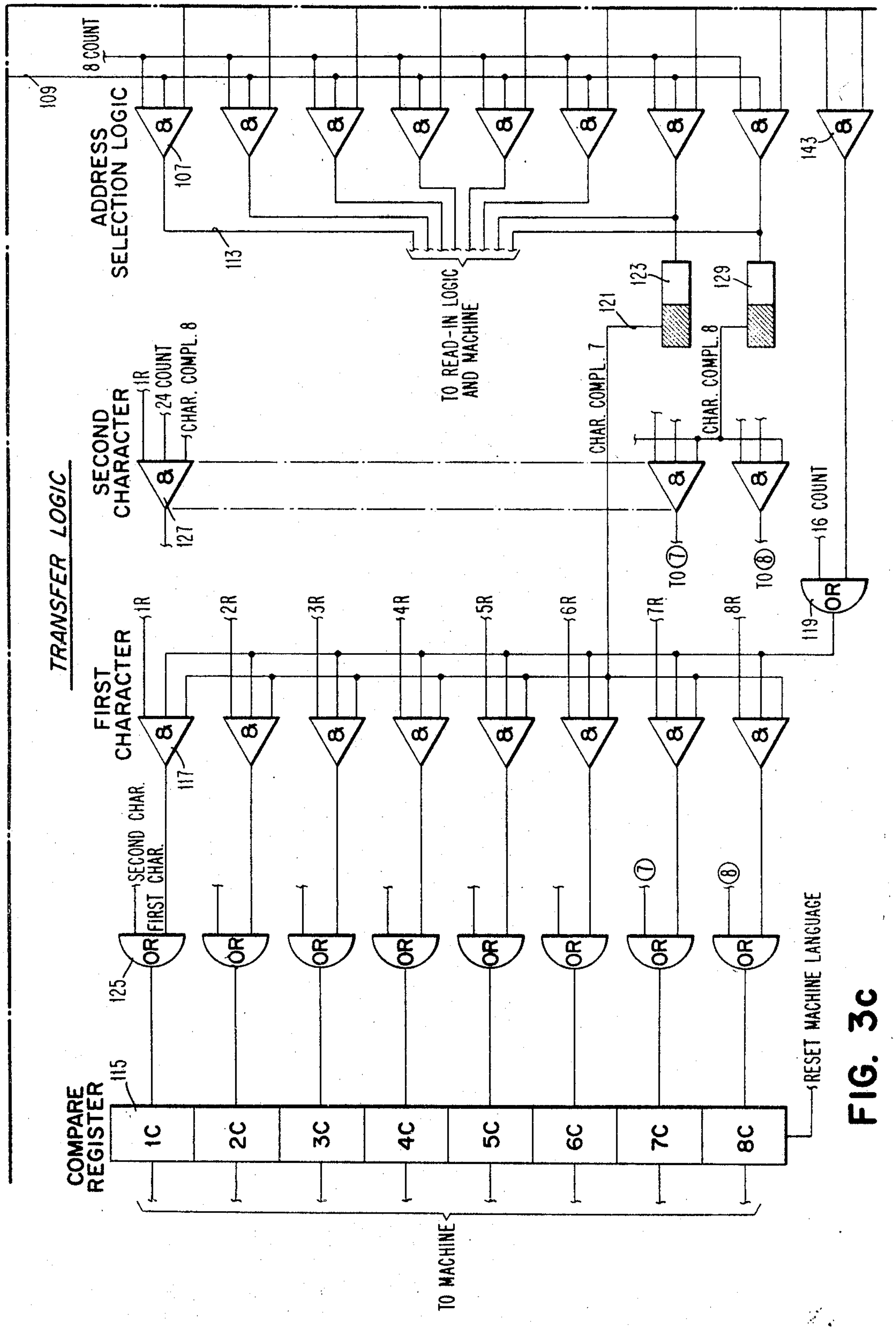
Figures 3, 3D:
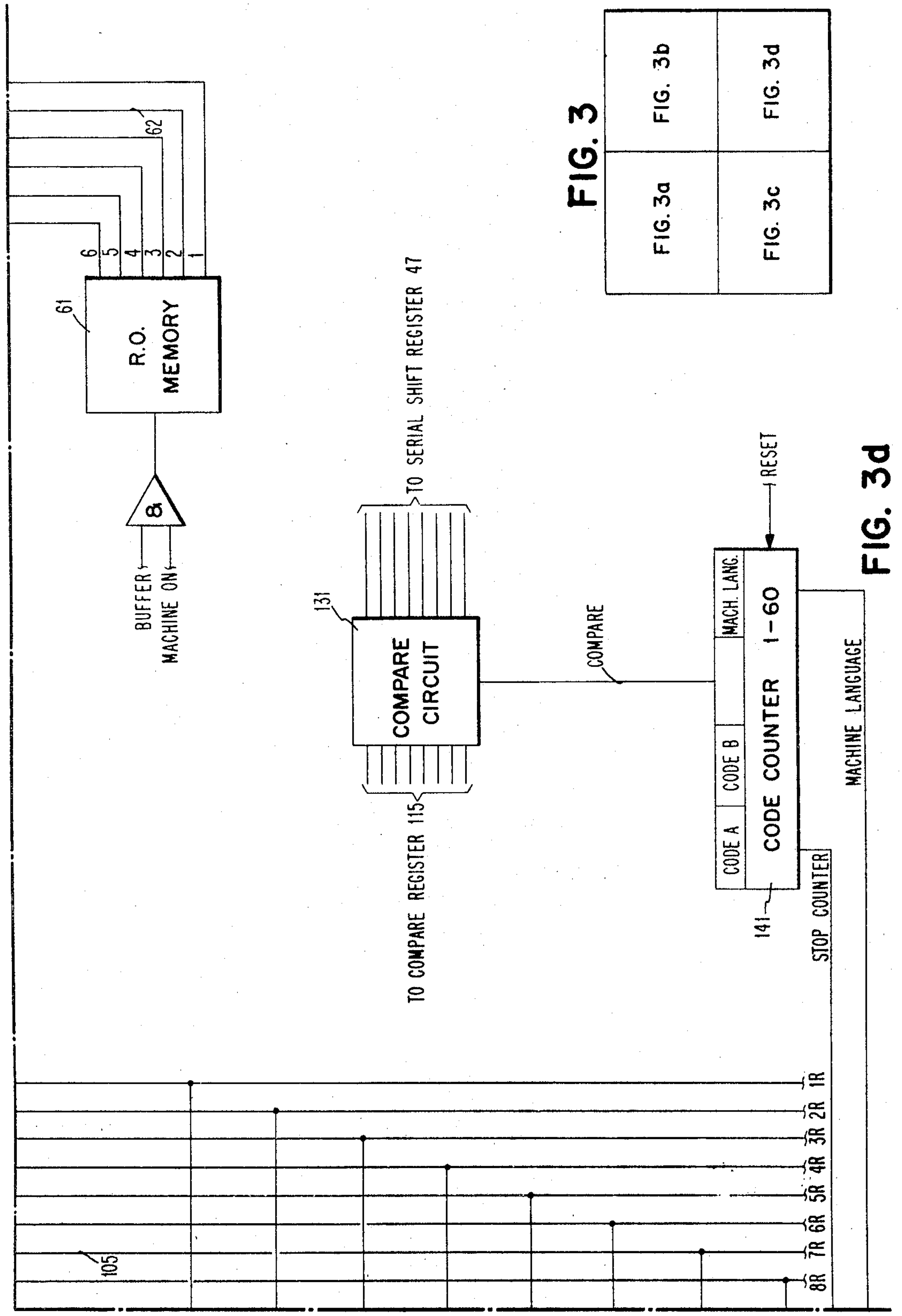
Figure 4:
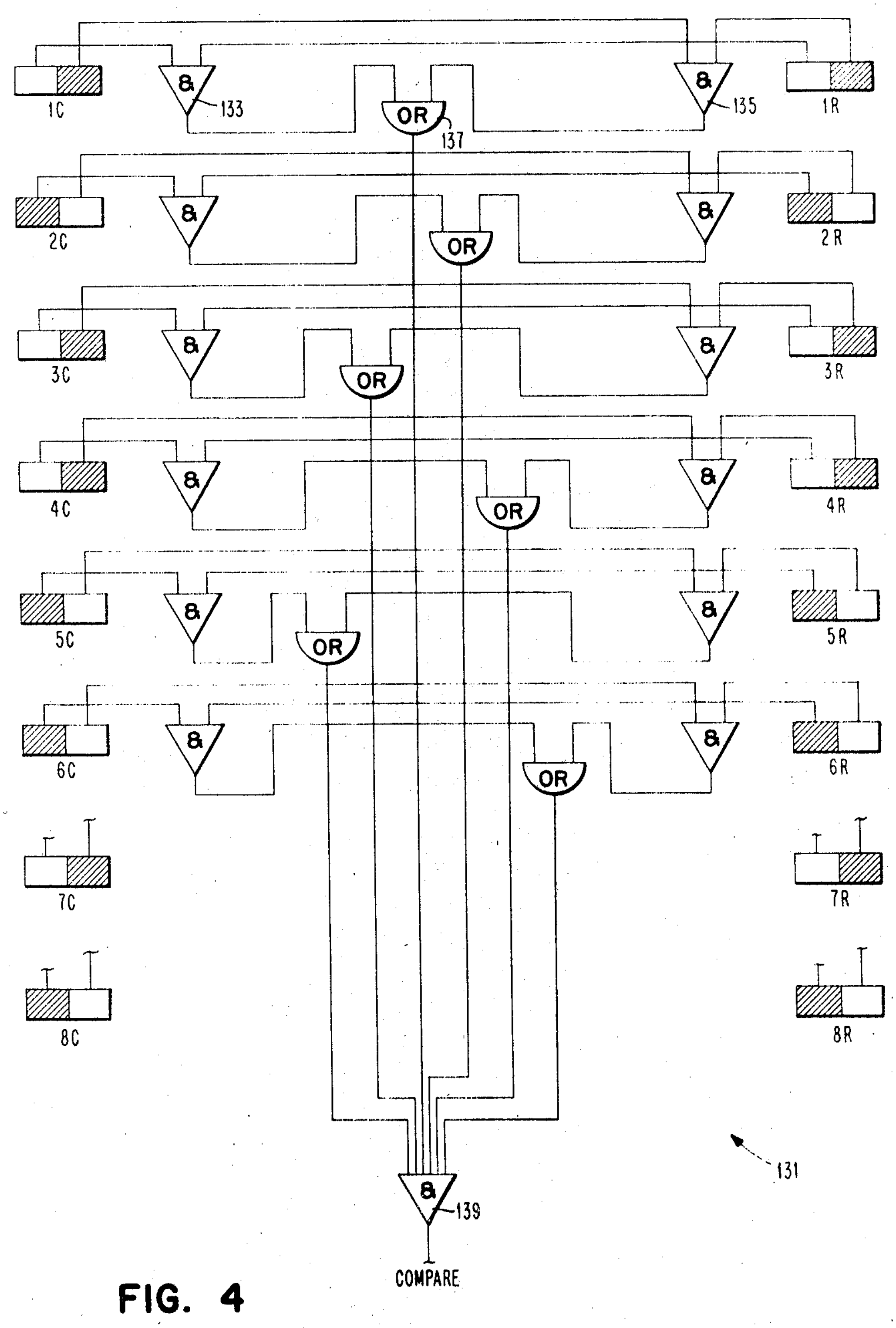
Figure 5:
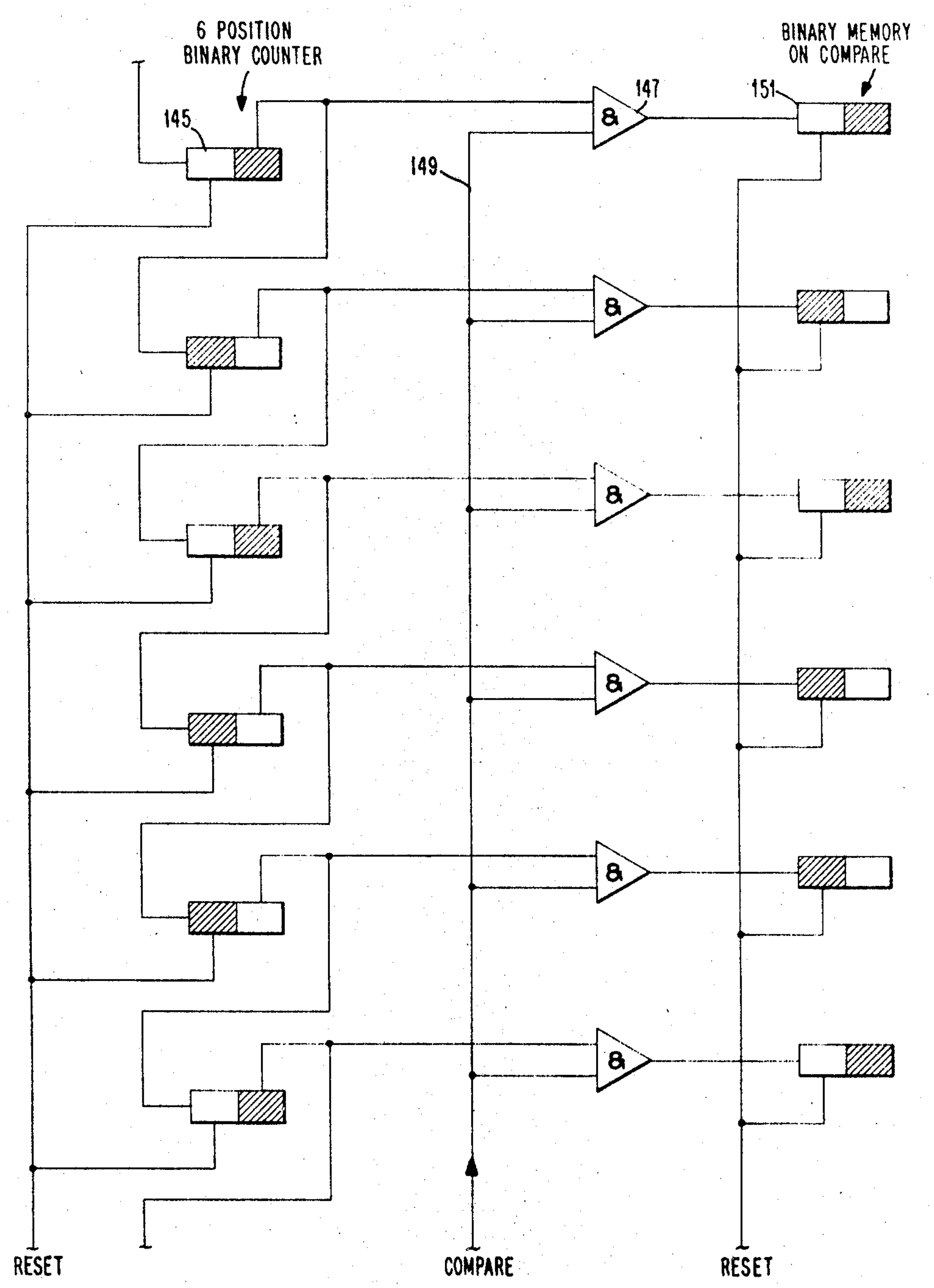
Figure 6B:
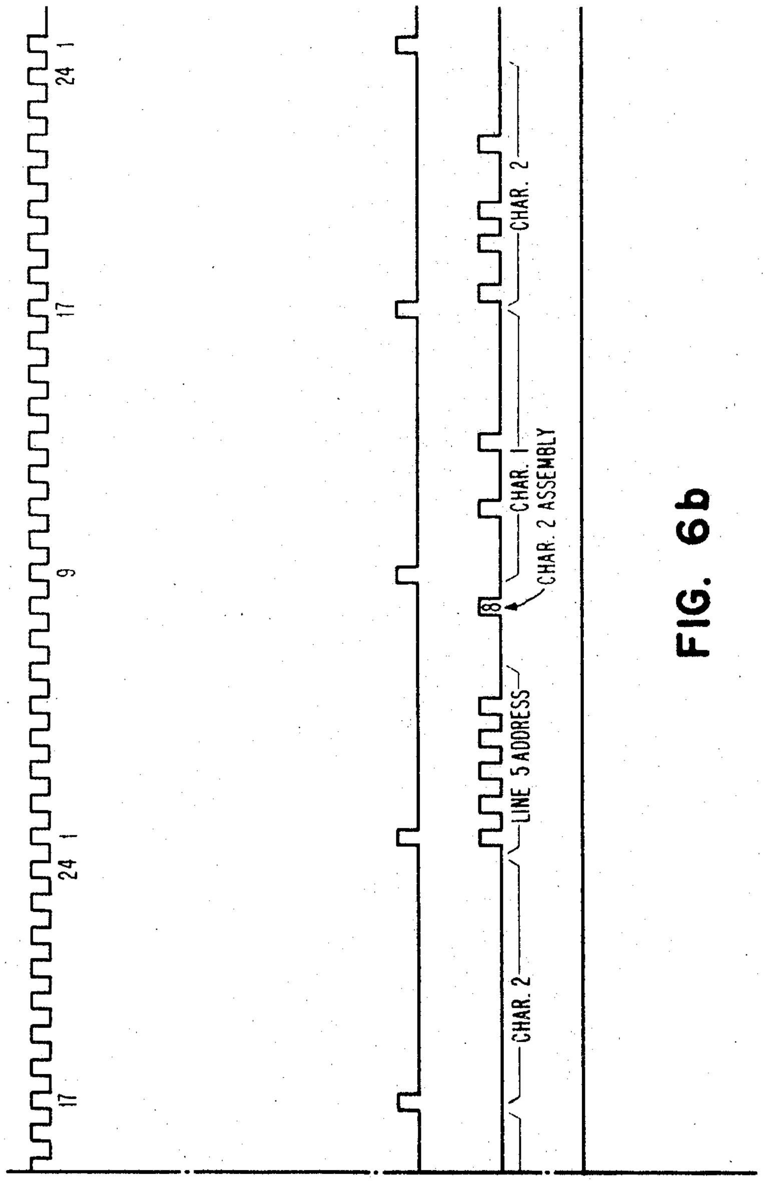
Figure 6A:
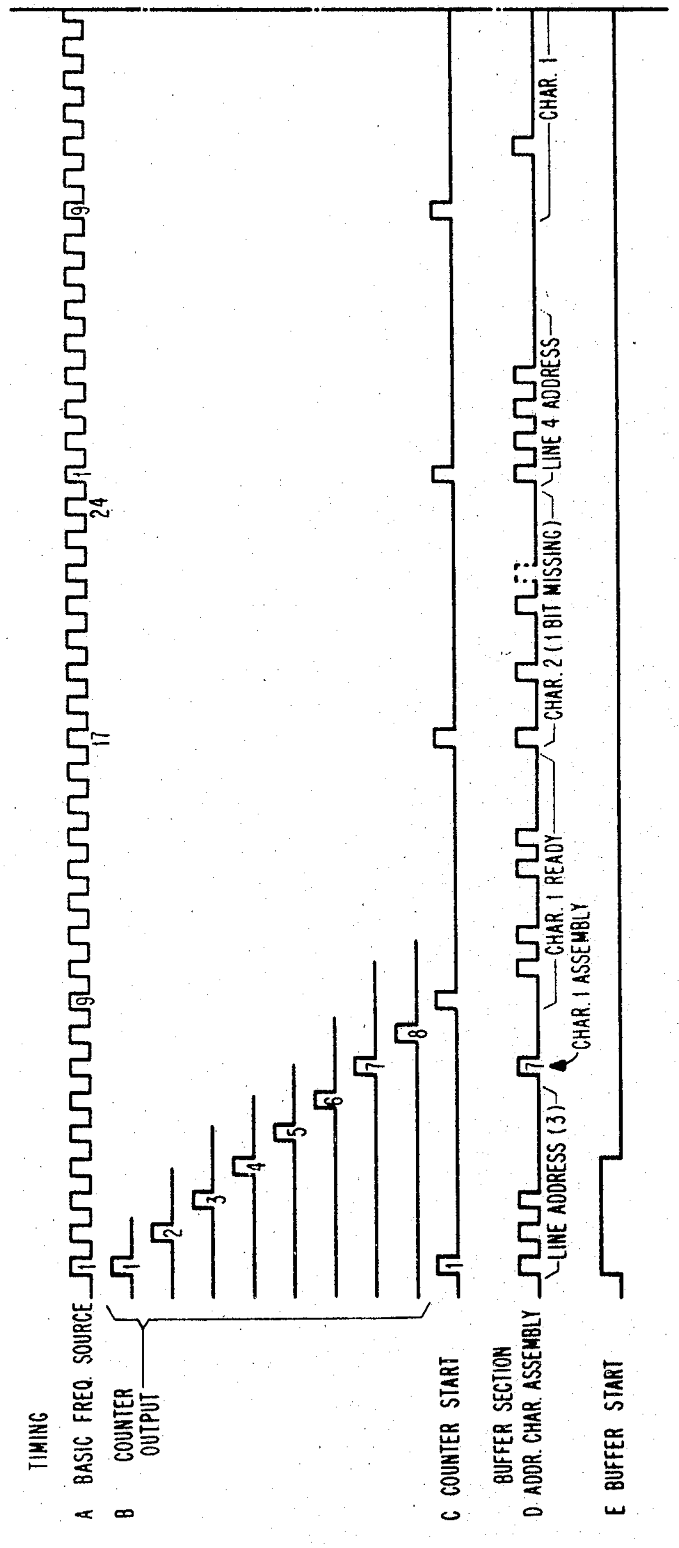

FIGS. 3*a*, 3*b*, 3*c*, and 3*d* are more detailed schematic circuit diagrams of a buffer-translator according to the invention;

FIGS. 4 and 5 are schematic circuit diagrams of portions of the circuit shown in block form in FIG. 3*d*;

FIGS. 6*a* and 6*b* are a timing diagram for the circuit of FIGS. 3*a*–3*d*.

Figure 1:
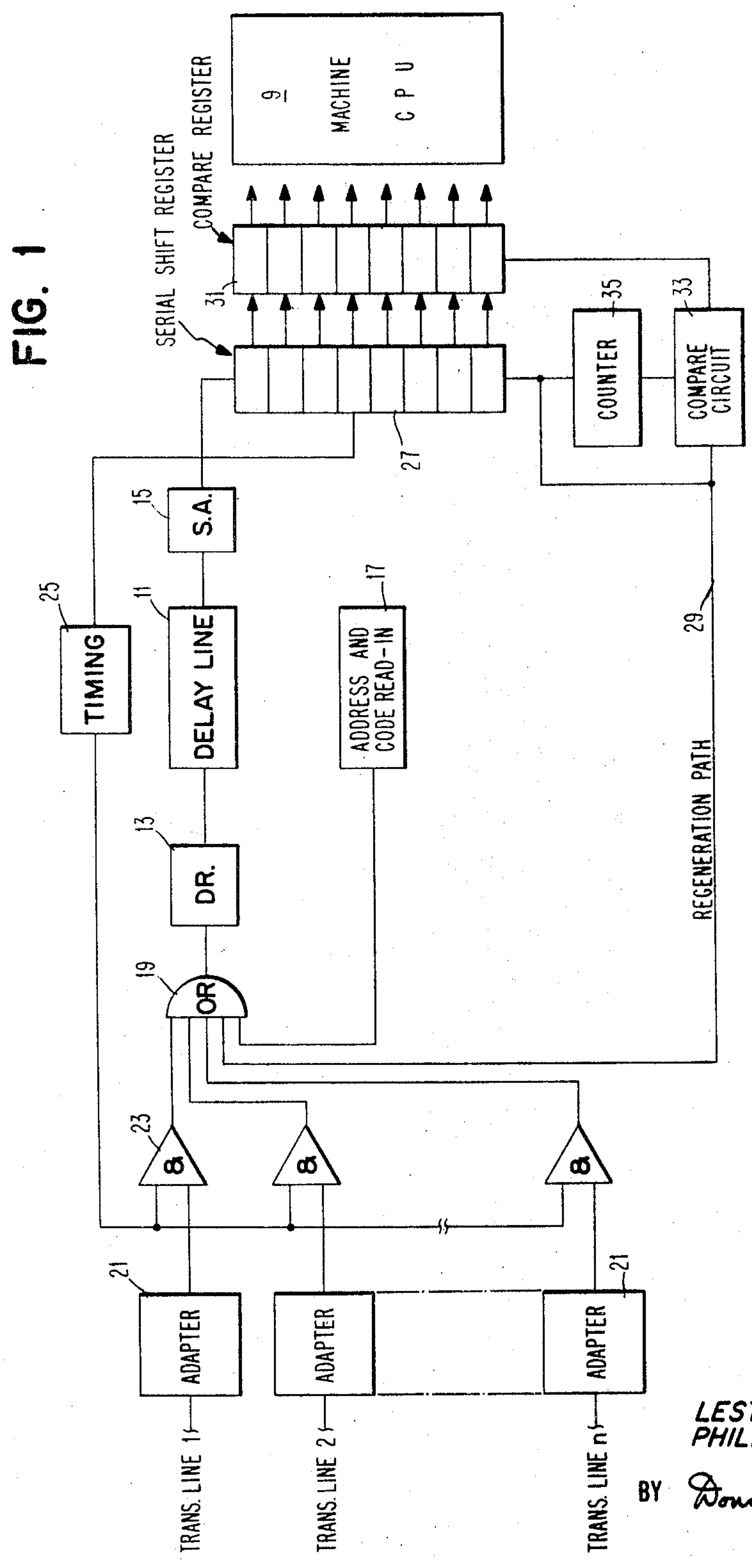
FIG. 1 is a schematic circuit diagram of the invention in a simplified form illustrating basic features of its structure and operation.

In FIG. 1, transmission lines 1, 2 . . . *n* transmit data from separate peripheral equipment, not here shown, such as typewriters, card punches, Teletype equipment or the like, through the buffer-translator according to the invention to a central processing unit 9. The data on the transmission lines 1 . . . *n* is in several codes possibly having different bit rates, and the lines at times work asynchronously with respect to one another, i.e., they have different timing references, different start times, etc. The several codes at different bit rates are converted into a single machine language code for feeding into the machine central processing unit 9. The translator for accomplishing this comprises essentially a relay line 11 having suitable driver circuits 13 and sense amplifier circuits 15 at the input and output, respectively. The delay line conveniently operates as a buffer in addition to its use as a translator.

Figure 2:
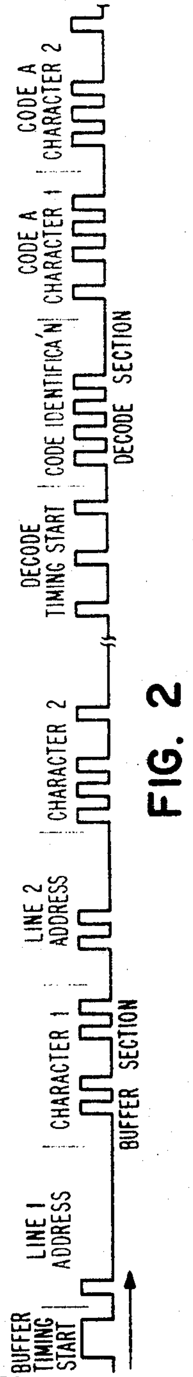
FIG. 2 is a timing diagram for the circuit of FIG. 1.

The basic features of operation of the invention will be reviewed with regard to FIGS. 1 and 2 before proceeding to the more detailed circuit shown in FIGS. 3 to 6.

Data constantly recirculating through the delay line 11 in a closed loop is divided into a buffer section and a decode section. This is most easily understood by imagining the delay line as having a portion assigned for the buffer application and a succeeding portion assigned for the translation information. The data in the buffer section includes a buffer timing start signal followed by an address for each of the transmission lines 1 . . . *n*, there being a space after each address for the insertion of character bits inserted from the transmission line corresponding to that address. The decode section includes a decode timing start signal followed by information on all of the various codes to be decoded. For each code there is, for example, a code identification and a reproduction of the various characters of that code in succession. There is a space for each of the different codes on the transmission lines 1 . . . *n*. At the very end are the various characters of the machine language code.

This address and code information which constantly recirculates through the delay line 11 is initially entered into the delay line by address and code read-in circuits 17 which may be, for example, a read-only storage or a card reader and registers. Information from the address and code read-in circuits 17 passes through OR circuit 19 to the delay line driver 13. The character bits from the transmission lines are entered into their correct location in the buffer section following the address of the particular line involved by suitable circuitry identified here as adapters 21. Information from each adapter 21 is gated by the respective AND circuit 23 connected to its output in synchronism with the timing device 25. The output of each of the AND circuits 23 provides an input to the OR circuit 19.

At the output end of the delay line, the sense amplifier 15 is connected to a serial shift register 27 having the required number of shift positions. The shift register 27 is in series with the delay line 11 and is in the regeneration path since data shifted out of this register travels through conductor 29 connected at its other end as an input to the OR circuit 19. The timing device 25 is also connected into the serial shift register 27. It is at this point of the buffer-translator, in the serial shift register, that line addresses can be recognized. Fully assembled characters from the transmission lines 1 . . . *n* can also be shifted out of the regeneration loop at this point to be translated. For this purpose, a second register 31, called the compare register, is located in parallel with the serial shift register 27 and has the same number of positions. A fully assembled unknown character to be translated is shifted out of the regeneration loop into the compare register 31 where it can be compared by means of appropriate compare circuits 33 connected between the two registers when the code information in the decode section of the delay line passes serially through the serial shift register 27.

There is now in the compare register 31 an unknown character in a known code, the code information having been assigned with the line. In all of the different codes stored in the decode section of the delay line, there is a one-to-one correspondence in position between a particular character in one code and this same character in any other code. Once a code is chosen, it will be a definite count to a particular character position from the start of that code. Upon propagating the decode information through the serial shift register 27, the known code is recognized and a character-by-character count is obtained on counter 35. One of the characters will compare bit-for-bit with that held as an unknown character in the compare register 31. This count is noted. Upon circulating the machine language code (the last code stored) through the serial shift register 27, the unknown character is shifted out of the compare register 31. When the machine coded character in count correspondence with the held count propagates through the serial shift register 27, this "decoded" character is shifted to the compare register 31 (which was cleared at the start of the machine language code) and is available to the central processing unit 9.

It is seen that several transmission lines are buffered into the central processing unit 9 and that the several different codes and line characteristics are reduced to a common machine language. This system accomplishes both the buffering and translating. In order to perform the translating function, the delay line must regenerate during the time the one bit is present at the transmission line. This determines the maximum length of line. For instance, in the event that the shortest bit rate on the transmission lines 1 . . . *n* is 5 milliseconds, then the delay line can be no more than five milliseconds in length in order to regenerate before the next bit appears. In order to operate as a buffer unit in addition to a translator unit, the delay line must have a sufficient capacity for both functions and this determines the minimum length of line. For large capacity requirements, glass delay lines are available which operate at ten megacycles and up. For lower capacity, it is possible to use lower cost magnetostrictive delay lines which operate, for instance, at one or two megacycles. For a five millisecond line operating at one megacycle, it is seen that there is a capacity of 5,000 bits. For the same line operating at two megacycles, there is a capacity of 10,000 bits, and this is usually sufficient for most purposes.

The serial delay line buffer-translator shown in FIGS. 3 to 6 operates essentially in the same manner as has been described with regard to FIGS. 1 and 2 but is exemplary of a more detailed preferred embodiment of the circuitry involved. Referring to FIGS. 3*a*–3*d*, delay line 41 has driver circuit 43 connected to its input and sense amplifier circuit 45 connected to its output. Serial shift register 47 is connected to the other side of the sense amplifier 45 and has eight positions identified as 1R to 8R. The recirculation loop includes conductor 49 which extends from the other end of the serial shift register through timing adjustment device 51 and becomes an input to an AND circuit 53. Data passes through the circuit 53 when the other input 55 connected to a basic frequency source 57 is "on" providing pulses or counts. The output of AND circuit 53 is an input to an OR circuit 59 connected to the driver circuit 43. The line address and code information is entered into this recirculation loop at the proper spacing at machine turn-on time by means of a read only memory 61 which reads in parallel on conductors 62 into positions 1 to 6 of the serial shift register 47. In this embodiment, there are six bit codes on the transmission lines to be buffered and translated, although it will be understood that the same principle applies to characters having a different number of bits.

The delay line memory is divided, time-wise, into a buffer section and a decode section large enough to accommodate as many codes as is required including at the end the machine language code. The arrangement of information in the delay line is the same as shown in FIG. 2 with the exception that in this embodiment there is a place following each line address for the assembly of two characters from that transmission line. This is illustrated in the pulse diagram D of the timing chart, FIG. 6. This diagram shows the line addresses for lines, 3, 4 and 5 with space following each address for the assembly of two charatcers from that line. As can be seen by comparing the pulse output of the timing source 57 (diagram A of the timing chart) each line address and character assembly space is given a total of 24 counts of which the first 8 counts are for the line address, counts 9 to 16 are for the first or character 1 assembly and counts 17 to 24 are for the second or character 2 assembly. Actually, the line address and line characters are given in six bit codes so that the last two bits of each character assembly area are not used. However, bits 7 and 8 in the line address section are used to indicate, respectively, the complete assembly of characters 1 and 2. To explain further, it will be recalled that the delay line regenerates during the time that one bit is present at any transmission line. The bits are assembled one-by-one as the data in the delay line is regenerated, and when all six bits are received a 7 or 8 bit is inserted before the line address according to whether character 1 or character 2 is completely assembled. By using this system of time discrimination, the bits can be assembled in their proper place in the data flow in the delay line.

The timing system includes the aforementioned basic frequency source 57 for producing a series of regularly spaced pulses. The output of pulse source 57 is gated through AND circuit 63 upon machine turn on into 1–8 counter 65. This counter produces counts 1 to 8 upon different lines as shown in diagram B of the timing chart, FIG. 6. An associated counter 67 produces an output on its 8 line while the first eight counts are being produced, an output upon its 16 line during counts 9–16, and an output upon its 24 line during counts 17–24. A counter start signal is applied to the counter 65 from an AND circuit 69 which produces an output when the buffer start is received in the serial shift register 47, recognized and transferred to circuit 69. The buffer start signal is shown in FIG. 2 and in diagram E of FIG. 6. It is seen that upon receiving the counter start signal, the counter 65 provides continuous groups of eight counts upon its outputs, whereas the counter 67 produces three outputs for each group of eight counts each. These recurring groups of counts continue throughout the entire time that the buffer section of the delay line is passing through the serial shift register 47. Counter 65 is reset at the end of each group of eight counts as shown in diagram C of the timing chart.

The buffer-translator being described has 1 . . . *n* incoming transmission lines of which transmission line *k* is shown at 71 in FIG. 3*a*. For the purpose of determining the characteristics of the delay lines needed in a sample system, let it be assumed that this embodiment has 40 different incoming transmission lines using eight different codes. It is therefore necessary to have a capacity in the buffer section for 40 addresses and space following each address for the assembly of two characters. The product of 40 times 24 bits for each set of addresses and characters is about 1,000 bits for the buffer section alone. Assuming that each code has 60 characters each with eight bits per character, the product is 8 times 480 bits per code or about 4,000 bits for the decode section of the delay line. The total bit requirement of this example is thus about 5,000 bits. Assuming that the fastest incoming signals on any one of the delay lines are 5 milliseconds apart, this determines the maximum length of the delay line since the delay line must regenerate between the two fastest adjacent bits on any line. For a five millisecond line, the basic frequency speed need be no greater than one megacycle in order to have space for about 5,000 bits. This capacity can be supplied by lower cost magnetostrictive delay lines, and more expensive high speed glass delay lines need not be used.

The entry of incoming character bits from the transmission lines, such as line *k*, into their proper place in the buffer section of the delay line will now be discussed. Bits arriving on any transmission line must be inserted behind their proper address in the buffer section and at the proper count of the character 1 or character 2 assembly space. Transmission line timing ring 73 keeps track of the character bit count as the bits arrive possibly asynchronously. Ring 73 is always in the 1 position when the first bit of a new character arrives. Since six bit codes are being used, ring positions 1 to 6 keep track of these bits while position 6 is used to actuate the insertion of the character complete bits 7 or 8 adjacent the line address. This is accomplished by energizing conductor 75 which serves as an input to the AND circuits 77 and 79. An output from the AND circuits 77 and 79 respectively sets the 7R and 8R positions of the serial shift register 47. To gate the circuits 77 and 79, it is necessary to have the 8 count from counter 67, a 7 or 8 signal from trigger 91 that the corresponding assembly spaces are open as will be explained later, and an L signal from trigger 101 indicating that bits have been passing through the read-in logic and it has been set (it is reset by the 1 count from the counter).

The read-in logic for admitting character bits from transmission line *k* to the delay line 43 includes a bank of AND circuits 81 corresponding to the number of bits (eight) in the address space. Each of these AND circuits 81 has four inputs, of which one is the bit pulse from the transmission line and another is from the respective position of the transmission line timing ring 73. To admit the transmission line bits to the character 1 assembly area of the buffer section following the address for line *k*, one of the counts 9 to 16 (identified as 1–16, 2–16, etc.) is needed. The fourth input is from the AND circuit 83 which is energized by address selection trigger 85 and input 87 which is "on" only when the character complete 7 bit does not appear after the line address, indicating that the character 1 assembly space is open.

The address selection simply means that the address for line *k* has appeared in the serial shift register 47 and gates AND circuit 89 in a manner to be explained in greater detail later, thereby turning on the trigger 85. Input 87 is energized by a trigger 91 which is normally "on" when the character 1 space is open, i.e., there is no character complete 7 bit. Trigger 91 changes state when AND circuit 93 is energized by each of its inputs turning on. One of the inputs is from the trigger 91 itself indicating that it is "on"; a second is the character complete 7 signal from the AND circuit 77; a third is the address selection; and a fourth is the 24 count signal from counter 67. The trigger 91 can be returned to its original "on" state by energizing the AND circuit 95. The inputs to the circuit 95 are the address selection, the character complete 8 signal from the AND circuit 79 and a signal from the trigger itself that it is in the other state.

It will be understood that there is another set of read-in logic AND circuits like the AND circuits 81 for admitting transmission line character bits into the character 2 assembly area of the buffer section of the delay line for the line *k*. These have similar inputs except that one input will be count 1–24, 2–24, etc. and the address selection input comes from an address gate line 97 from the trigger 85. It is possible, of course, to buffer more than two characters in the buffer section following each line address. This is done simply by adding additional read-in logic and amending the timing system so as to work on a basis of 32 or 40 counts or the like, rather than a 24 count basis.

The outputs of the AND circuits 81 forming a part of the read-in logic are applied to an OR circuit 99 whose output is in turn connected to the OR circuit 59 along line 103. Other conducttors 103*a* and 103*b* are connected to the other transmission line 1 . . . *n* through a similar arrangement of read-in logic and timing rings.

The aforementioned transmission line address selection is accomplished by sensing the line address of the fully assembled character at the serial shaft register 47 with the address selection logic. The line address bit levels and also that of the character complete bits 7 or 8 are conducted along lines 105 and each becomes an input to one of eight AND circuits 107 forming part of the address selection logic. A second input to the AND circuits 107 is provided along conductor 109 to a trigger 111 which is turned on when the counter start signal is received. The trigger 111 remains on during the entire buffer section of the delay line when the addresses are passing through the serial shift register 47. A third input to the AND circuits 107 is provided by the 8 count signal from the counter 67 to indicate that counts 1–8 of the 24 count timing cycle are on. The address selection information from the AND circuits 107 is available to be applied to the read-in logic (as inputs to AND circuits 89 and 93, 95) and is also made available to the machine to indicate which transmission line is presenting a buffered and translated character.

Once an unknown character has been assembled in the buffer section of the delay line memory and a character complete bit 7 or 8 has been assigned signifying it is complete, this character is transferred through transfer logic to a compare register 115 on the following regeneration when the address for this character appears in the serial shift register 47. The compare register 115 has the same number of positions as the register 47 and are identified as 1C to 8C. An assembled character in the character 1 assembly area is shifted in parallel out of the serial shift register 47, and each bit becomes one of the inputs to a bank of AND circuits 117 forming part of the transfer logic. A second input for each of the AND circuits 117 is a 16 count signal derived from an OR circuit 119. A third input is provided by a character complete 7 signal along conductor 121 obtained from the turning on of a trigger 123. Trigger 123 is turned on when the AND circuit 107 in the address selection logic for the seventh bit is gated. The outputs of the AND circuits 117 are applied to a corresponding row of OR circuits 125 which connect to the various positions of the compare register 115.

The transfer logic includes another bank of AND circuits 127 for the character 2 bits. These are similar to the AND circuits 117 for the first character bits and each has three inputs of which one is from the corresponding position of the serial shift register 47, the second is a 24 count bit from the counter 67, and the third is a character complete 8 signal from a trigger 129 connected to the AND circuit 107 in the address selection logic for the 8 bit. It will be recalled that the 8 bit indicates the completion of character 2 in the proper section of the delay line. The outputs of the various AND circuits 127 are applied to the corresponding one of the OR circuits 125 which gates the bits into the compare register 115.

To this point there has been described the initial reading in to the delay line of line address and code information from the read only memory 61, the reading into the delay line in the proper position following its respective address of unknown character bits from the transmission lines 1 . . . *n*, and the shifting out of the completed unknown character from the serial shift register 47 through the transfer logic into the compare register 115. The analysis of what happens as the decode section of the delay line memory passes through the serial shift register 47 will now be undertaken. It will be recalled from the discussion of FIGS. 1 and 2 that the decode section generally includes a decode timing start signal followed by a section for each of the codes present on the transmission lines 1 . . . *n*. Each of the codes is identified by a unique start signal. There follows each of the characters in the code, and in the embodiment being described there are 8 bits per character and 60 characters per code. At the very end there is a section for the machine language code. Characters in the various codes which are the same and translate to the same character in the machine code have the same relative place or count in all the codes and can be located by counting from the beginning. For example, the fifth character in all of the codes is the same and can be located by running a character counter to counter 5. The general operation is to compare each character in the various codes bit for bit with the unknown character in the compare register 115 and note the count of the character in the decode section of the delay line when a comparison is made. Then when the machine language code begins to circulate through the serial shift register 47, the unknown transmission line character is gated out of the compare register 115 and replaced by the character in the machine language code when the machine language count corresponds to the previously noted count from the transmission line codes.

The compare circuit 131 connected between the compare register 115 and the serial shift register 47 is shown in block form in FIG. 3*d* and in more detail in FIG. 4. The six positions of the compare register (assuming a 6 bit code) in FIG. 4 are shown as being in comparison with the corresponding positions of the serial shift register. The circuit between corresponding register positions is the same, and only one will be described. Like sides of 1C and 1R are connected to AND circuit 133 which is gated when both are in the same state. In similar manner, the other sides of 1C and 1R are connected to AND circuit 135. The outputs of circuits 133 and 135 are connected to OR circuit 137 which in turn is one of the inputs to a 6 input AND circuit 139. When each of the six inputs of AND circuit 139 are energized due to there being a comparison between the respective pairs of positions in the compare and serial shift registers, a compare output signal is obtained.

A code counter 141 (FIG. 3*d*) having as many counts as there are code characters, 1 to 60 for this embodiment, is provided to keep count of the code characters as they are circulated through the serial shift register 47. The code identification signal at the start of each code is used to reset code counter 141. When there is a compare signal from the compare circuit 131, counter 141 is set stopped and a stop counter signal is applied as one input to an AND circuit 143. The output of the AND circuit 143 goes to the OR circuit 119 of the transfer logic.

As the machine language code identification passes through the serial shift register 47, the code counter 141 is reset and counts until the same count is reached as when the stop signal occurred. At this point there is a count correspondence and the machine language code character in the serial shift register 47 corresponds to the unknown transmission line character stored until just recently in the compare register 115. This unknown character in the transmission line code is gated out of the compare register when the machine language code identification appears. A machine language code input to the AND circuit 143 is also energized at this time, so that the transfer logic AND circuits 117 allows the machine language code in the serial shift register to be transferred into the compare register 115. The unknown transmission line character is now available in machine language code to to be gated to the central processing unit.

A counter with memory gate of a type consistent with the operation of block 141 as described above is shown in FIG. 5. A 6 position binary counter comprises triggers 145 connected as illustrated. A reset signal can be applied to one side of the triggers while the other sides are each coupled to one of a bank of AND circuits 147. When there is a compare along line 149, the AND circuits 147 conduct or not according to the state of triggers 145 to set triggers 151, which provide a binary memory on compare.

It is seen that the serial memory provided by the delay line 41 serves as a combination buffer and code translator where there may be a number of codes. Buffering by means of a delay line is well known in the art, but the ability of this organization to buffer and translate by means of counting and by means of characters in the several codes being in count correspondence provides an advantage not previously available. One of these codes is the machine code. This results in an unknown character being buffered and transferred to a machine in its language without any significant addition of logic and cost. This is of particular interest in transmission line buffering where several types of equipment are buffered into a single central processing unit.

While the invention has been particularly shown and described with reference to a preferred embodiment thereof, it will be understood by those skilled in the art that various changes in form and details may be made therein without departing from the spirit and scope of the invention.

What is claimed is:

1. A buffer-translator for converting several different codes on a plurality of incoming lines to a single machine language code, each of the codes having a plurality of characters, said buffer-translator comprising a data recirculation loop including serial memory means, means connected to said incoming lines and said loop for reading line address information and code information into the loop for constant regeneration, said code information comprising all of the characters in each of the codes including the machine language code, the count of like characters in the several codes being the same, means connected to said incoming lines and said loop for reading unknown characters from said incoming lines into the recirculation loop behind their respective line addresses, storage means external of said loop and connected to said loop, an unknown character being transferred from the recirculation loop into said storage means, and comparing means connected to said storage means and said loop for comparing the unknown character in said storage means with each of the code characters circulating in said loop and for counting the code characters in each of the codes, the count at compare being stored, the machine language code character corresponding to the unknown character being transferred from said recirculation loop when there is a count correspondence with the stored count as the machine language characters are being counted.

2. A buffer-translator for converting several different codes on a plurality of incoming lines to a single machine language code, the several codes having a plurality of bit rates and each having a plurality of characters, said buffer-translator comprising a data recirculation loop including a serial memory device which regenerates within the bit rate of any of the lines, means connected to said incoming lines and said loop for reading line address information and code information into the loop in succeeding sections for constant regeneration, said code information comprising all of the characters in each of the codes including, at the end, the machine language code, the count of like characters in the several codes being the same.

means connected to said incoming lines and said loop for reading unknown characters from said incoming lines into the recirculation loop behind their respective line addresses, first storage means connected in said recirculation loop and second storage means external of said loop and connected to said loop, a completed unknown character being transferred from said first into said second storage means, comparing means connected to said first storage means and to said second storage means for comparing the unknown character in said second storage means with each of the code characters circulating in said loop upon passage thereof through said first storage means, and means connected to said comparing means for counting the code characters of the various codes while comparing and for storing the count at compare, the machine language code character corresponding to the unknown character being transferred from said first storage means when there is a count correspondence with the stored count as the machine language characters are circulated through the first storage means.

3. A buffer-translator for converting several different codes on a plurality of incoming lines to a single machine language code, each of the codes having a plurality of characters, said buffer-translator comprising a sonic delay line connected in a recirculation loop, means connected to said incoming lines and to said delay line for reading line address information and code information into the delay line in respective buffer and decode sections for constant regeneration, said code information comprising all of the characters in each of the codes including, at the end, the machine language code, the count of like characters in the several codes being the same, means connected to said incoming lines and to said delay line for reading unknown characters from the incoming lines to said buffer section behind their respective line addresses, first storage means connected in said recirculation loop and second storage means external of said loop and connected to said loop, a completed unknown character being transferred from said first into said second storage means, comparing means connected to said first storage means and to said second storage means for comparing the unknown character in said second storage means with each of the code characters in said decode section upon passage thereof through said first storage means, and means connected to said comparing means for counting the code characters of each of the codes while comparing and for storing the count at compare, the machine language code character corresponding to the unknown character being transferred from said first storage means when there is a count correspondence with the stored count as the machine language characters are circulated through the first storage means.

4. A buffer-translator for converting several different codes on a plurality of incoming lines to a single machine language code, each of the codes having a plurality of characters, said buffer-translator comprising a data recirculation loop including serial memory means and serial register means, read only memory means connected to said loop for reading line address information and code information into the loop for constant regeneration, said code information comprising all of the characters of each of the codes including, at the end, the machine language code, the count of like characters in the several codes being the same, means connected to said incoming lines and to said loop for reading unknown characters from the incoming lines into the recirculation loop behind their respective line addresses, a compare register connected to said loop, a completed unknown character being transferred from the recirculation loop into said compare register, and comparing means connected to said loop and to said compare register for comparing the unknown character in said compare register with each of the code characters circulating in the loop and for counting the code characters in each of the codes, the count at compare being stored, the machine language code character corresponding to the unknown character being transferred in parallel from said recirculation loop when there is a count correspondence with the stored count as the machine language characters are being counted.

5. A buffer-translator for converting several different codes on a plurality of incoming transmission lines to a single machine language code, the several codes having a plurality of bit rates and each having a plurality of characters, said buffer-translator comprising a data recirculation loop including a serial delay line which regenerates within the bit rate of any of the lines and also including serial register means, read only memory means connected to said loop for reading line address information and code into the loop for constant regeneration, said code information comprising all of the characters of each of the codes including, at the end, the machine language code, the count of like characters in the several codes being the same, means connected to said incoming lines and to said loop for reading unknown characters from the incoming lines into the recirculation loop behind their respective line addresses, a compare register connected to said loop, a completed unknown character being transferred from the serial register means into said compare register, comparing means connected to said loop and to said compare register for comparing the unknown character in said compare register with each of the code characters circulating through said serial register means, and means connected to said comparing means for counting the code characters in each of the codes during compare, the count at compare being stored, the machine language code character corresponding to the unknown character being transferred in parallel from said serial register means into said compare register, for subsequent delivery to a machine, when there is a count correspondence with the stored count as the machine language code characters are being counted.

6. A buffer-translator for converting several different codes arriving serially by bit at different bit rates on a plurality of incoming transmission lines to a single parallel by bit machine language code, said buffer-translator comprising a data recirculation loop including a delay line which regenerates within the bit rate of any of the transmission lines, means connected to said loop for reading line address information and code information into the delay line in respective buffer and decode sections for constant regeneration, said code information comprising all of the characters in each of the codes including, at the end, the machine language code, the count of the like characters in the several codes being the same, means connected to said incoming lines and to said loop for reading unknown characters from the incoming transmission lines into said buffer section behind their respective addresses, first serial register means connected in said recirculation loop and second register means external of said loop and connected to said loop, a completed unknown character being transferred in parallel from said first into said second register means, comparing means connected to said first register means and to said second register means for comparing the unknown character in said second register means with each of the code characters in said code section upon passage thereof through said first register means, means connected to said comparing means for counting the code characters of each of the code while comparing and for storing the count at compare, the second register means being cleared upon passage of the machine language code through the first register means, and the machine language code character being transferred from said first register means into said second register means, for subsequent delivery to a machine, when there is a count correspondence with the stored count as the machine language code characters are circulated through the first register means.

7. The combination as defined in claim 6 wherein the means for reading line address information and code information into the delay line comprises a read-only memory for reading in parallel into the first register means.

8. The combination as defined in claim 6 wherein there is space behind each of the line addresses in the buffer section of the delay line for the assembly of at least two unknown characters, and means connected to said delay line for selectively inserting character complete bits adjacent each of the line addresses,

References Cited

UNITED STATES PATENTS

| | | | |
|---|---|---|---|
| 3,274,341 | 9/1966 | Allen | 179—15.55 |
| 3,308,437 | 3/1967 | Barbagallo et al. | 340—172.5 |
| 3,310,629 | 3/1967 | Cassidy | 178—50 |
| 3,348,205 | 10/1967 | Lex | 340—172.5 |

MAYNARD R. WILBUR, Primary Examiner

GARY R. EDWARDS, Assistant Examiner

UNITED STATES PATENT OFFICE

CERTIFICATE OF CORRECTION

Patent No. 3,466,432 September 9, 1969

Lester R. Adams et al.

It is certified that error appears in the above identified patent and that said Letters Patent are hereby corrected as shown below:

Column 8, line 59, the period should be a comma. Column 10, line 59, before "addresses" insert -- line --; line 73, "code", second occurrence, should read -- codes --. Column 12, line 5, "addresses," should read -- addresses. --; line 10, "3,310,629" should read -- 3,310,626 --.

Signed and sealed this 11th day of August 1970.

(SEAL)
Attest:

Edward M. Fletcher, Jr.
Attesting Officer

WILLIAM E. SCHUYLER, JR.
Commissioner of Patents